United States Patent
Ariga

(10) Patent No.: US 6,625,455 B1
(45) Date of Patent: Sep. 23, 2003

(54) PORTABLE TELEPHONE SYSTEM AND COMMUNICATION CONTROL METHOD FOR PORTABLE TELEPHONE SET IN A RESTRICTED ZONE

(75) Inventor: Kenichi Ariga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/131,571

(22) Filed: Aug. 10, 1998

(30) Foreign Application Priority Data

Aug. 11, 1997 (JP) .............................................. 9-227020

(51) Int. Cl.[7] .................................................. H04Q 7/20
(52) U.S. Cl. ......................... 455/456; 455/565; 455/574
(58) Field of Search ................................. 455/501, 515, 455/517, 426, 456, 66, 38.3, 212, 218, 565, 567, 70, 343, 422

(56) References Cited

U.S. PATENT DOCUMENTS

| | | | | |
|---|---|---|---|---|
| 5,146,610 A | * | 9/1992 | Longshore et al. | 455/35.1 |
| 5,224,150 A | * | 6/1993 | Neustein | 455/31.2 |
| 5,390,341 A | * | 2/1995 | Ziniel | 455/517 |
| 5,442,805 A | * | 8/1995 | Sagers et al. | 455/456 |
| 5,559,862 A | * | 9/1996 | Bhagat et al. | 455/460 |
| 5,774,806 A | * | 6/1998 | Tayloe et al. | 455/427 |
| 5,828,949 A | * | 10/1998 | Silver et al. | 455/38.3 |
| 5,940,764 A | * | 8/1999 | Mikami | 455/456 |
| 6,011,973 A | * | 1/2000 | Valentine et al. | 455/456 |
| 6,085,096 A | * | 7/2000 | Nakamura | 455/456 |
| 6,128,485 A | * | 10/2000 | Mori et al. | 455/422 |
| 6,343,212 B1 | * | 1/2002 | Weber et al. | 455/404 |

FOREIGN PATENT DOCUMENTS

| | | | | |
|---|---|---|---|---|
| EP | 0830046 A2 | * | 3/1998 | H04Q/7/38 |
| WO | WO 99/55102 | * | 10/1999 | H04Q/7/20 |

* cited by examiner

*Primary Examiner*—Dwayne Bost
*Assistant Examiner*—Sonny Trinh
(74) *Attorney, Agent, or Firm*—Dickstein, Shapiro, Morin & Oshinsky, LLP.

(57) ABSTRACT

A simple base station device 100 is installed in the entrance or the like of a building and a power OFF signal is supplied. A portable telephone set 101 that has received the signal informs the simple base station 100 of its telephone number, also informs a position management server 104 of the same via a public base station device 102 to register it, the position management server 104 being located in a radio network, and switches OFF power for a radio section. An incoming call operation to the portable telephone set 101 is carried out by referring to the registered content of the position management server 104. Thus, a power supply for a portable telephone set in a use prohibition area is reduced and no incoming call control is performed.

6 Claims, 6 Drawing Sheets

WHEN PORTABLE TELEPHONE SET HOLDER ENTERS BUILDING

WHEN PORTABLE TELEPHONE SET HOLDER GOES OUT OF BUILDING

PORTABLE TELEPHONE SYSTEM AND COMMUNICATION CONTROL METHOD FOR PORTABLE TELEPHONE SET IN A RESTRICTED ZONE

BACKGROUND OF THE INVENTION

The present invention relates to a portable telephone system for a mobile radio telephone set such as PDC or PHS, which enables a network and a mobile radio telephone set to be efficiently operated when a call is made to the mobile telephone set not placed in an incoming call enable state.

In recent years, there has been a rapid spread of a portable telephone set. The portable telephone set can make a call and receive a call from any place as long as it is within a service area. But manners of using it have begun to be questioned. The use of the portable telephone set is even prohibited in certain buildings such as hospitals or hotels.

Conventionally, as manners when entering the area prohibiting the use of the portable telephone set, power for the telephone set has been cut beforehand or an automatic answering service has been made effective, the automatic answering service being provided for proxyreceiving the voice of a call made to the portable telephone set in a network side. But it was necessary for any of these to be operated by own key operations.

FIG. 5 shows a sequence of operations when a call comes in to a portable telephone set held in a power OFF state or out of receivable bounds in a conventional potable telephone set.

Conventionally, when a power ON operation is carried out for the portable telephone set within a service area, a position registration process (501) of the telephone set is performed for a database used for position management and located in the network. In other words, a position registration request is made from the portable telephone set 51 to a position management server via a public base station, and the position registration server informs, after its registration, the portable telephone set 51 of its position registration reception.

It is now assumed that after the completion of position registration, a holder of the portable telephone set 51 moves indoors and performs a power OFF operation. Then, when call setting is made from a portable telephone set 52 (502), since it is impossible to understand the state of the portable telephone set 51, the network performs processing for calling the portable telephone set 51 from the base station where its position has been registered (503). However, actually since the portable telephone set 51 is not in a call receiving state, after a time-out, a voice message or the like indicating connection unable is sounded to the portable telephone set 52 (504).

FIG. 6 shows a sequence of operations when after the above position registration, a holder of a portable telephone set 61 moves indoors where the use of the portable telephone set is prohibited and sets an automatic answering mode in the conventional portable telephone set. After the automatic answering mode has been set from the portable telephone set 61 (601), when call setting or a call setting reception is made by the portable telephone set 61 (602), as in the above case, since it is impossible to understand the state of the portable telephone set 61, the network performs processing for calling the portable telephone set 61 from the base station where its position has been registered (603). However, since the portable telephone set 61 is not in a call receiving state, after a time-out, the network recognizes setting of the automatic answering mode for the portable telephone set 61, connects with the portable telephone set 61 and sets a pass for storing voices in a message server.

Such a portable telephone system was disclosed in, for example JP-A-69999/1994. The portable telephone system of this publication is configured to automatically receive, by setting a predetermined mode beforehand, a call without giving a calling sound so as to transmit a message to an opposite party or record a message if the telephone set cannot answer an incoming call. This portable telephone system is operated under the condition of setting a mode by a user himself beforehand.

On the conventional portable telephone system, since it doesn't have any means for recognizing the power OFF state of the portable telephone set, the setting state of the automatic answering mode or the location of the potable telephone set (out of receivable bounds), inconveniences have occurred, for example a call incoming to the portable telephone set prohibited from use, and useless incoming call control performed by the base station for the portable telephone set not placed in a call receivable state.

Furthermore, a power supply for the portable telephone set must be switched OFF or the automatic answering mode must be set for stopping the use of the portable telephone set or the like in an area where its use is prohibited. Thus, to enter an area, for instance a building, where the use of the portable telephone set is prohibited, its holder must perform such an operation himself.

SUMMARY OF THE INVENTION

It is an object of the present invention to prevent calls from incoming to a portable telephone set located in an area where its use is prohibited and a base station from performing any useless incoming call control for the portable telephone set not placed in a call receivable state.

It is another object of the present invention to enable a holder to reduce power for his portable telephone set without much attention when moving to a place prohibiting its use.

According to the present invention, a portable telephone system achieves the above tasks by supplying a power OFF signal when a holder enters a building or the like where use of a portable telephone set is prohibited, also informing a position management service in a network of communication suspension of the portable telephone set and registering the communication suspension.

Specifically, according to the present invention, a simple base station device is installed in the vicinity of the building where the use of the portable telephone set is prohibited, and the power OFF signal is supplied from device to the portable telephone set of the holder. Further, the simple base station device supplies and registers an ID number received from the portable telephone set in the position management server in the network through a base station device of the portable telephone set.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1A:
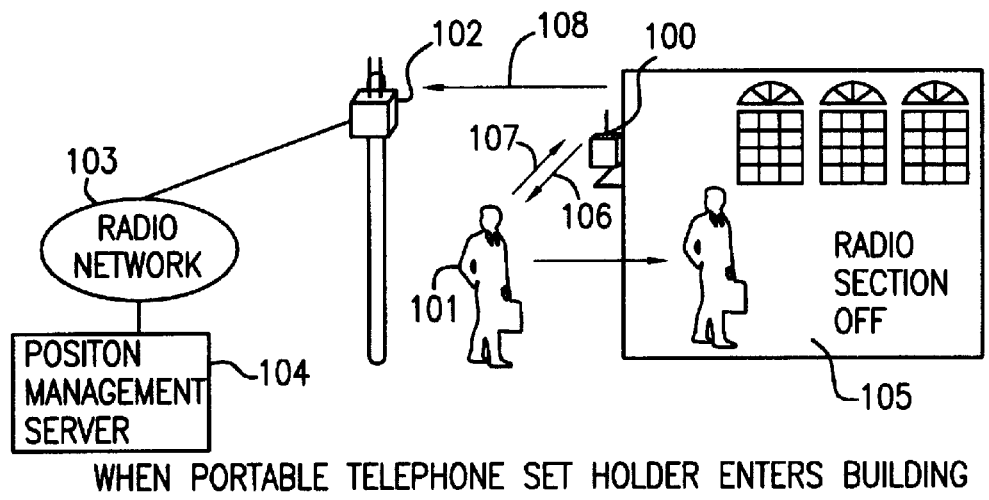
FIG. 1A and FIG. 1B are system concept view illustrating the present invention.
Figure 1B:
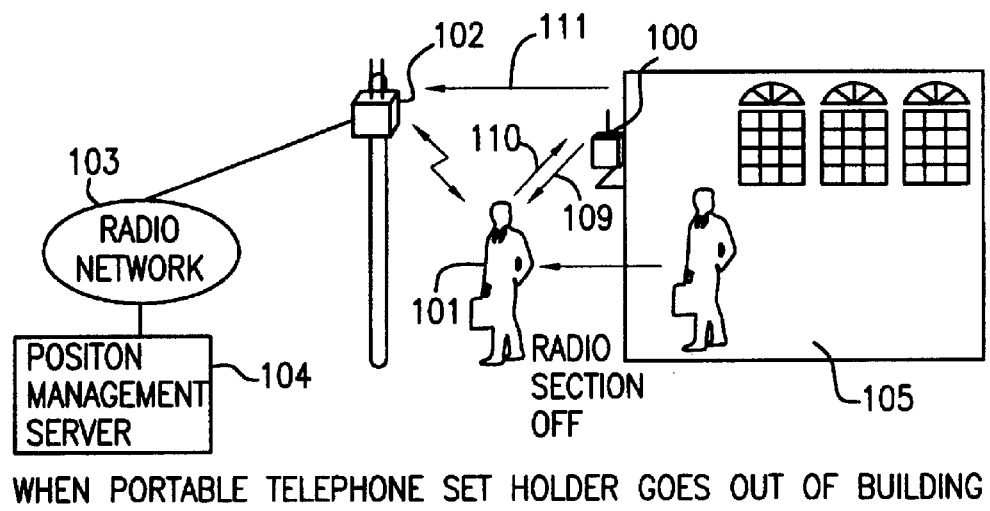

Next, a mode of carrying out the present invention will be described in detail with reference to the accompanying drawings. FIG. 1 is a view showing a concept of the present invention.

An embodiment of the present invention comprises a radio network 103, a terminal position management server 104 installed in the network, a public base station device 102 connected to the radio network and a simple base station device 100 installed in an entrance to a building.

Figure 2:
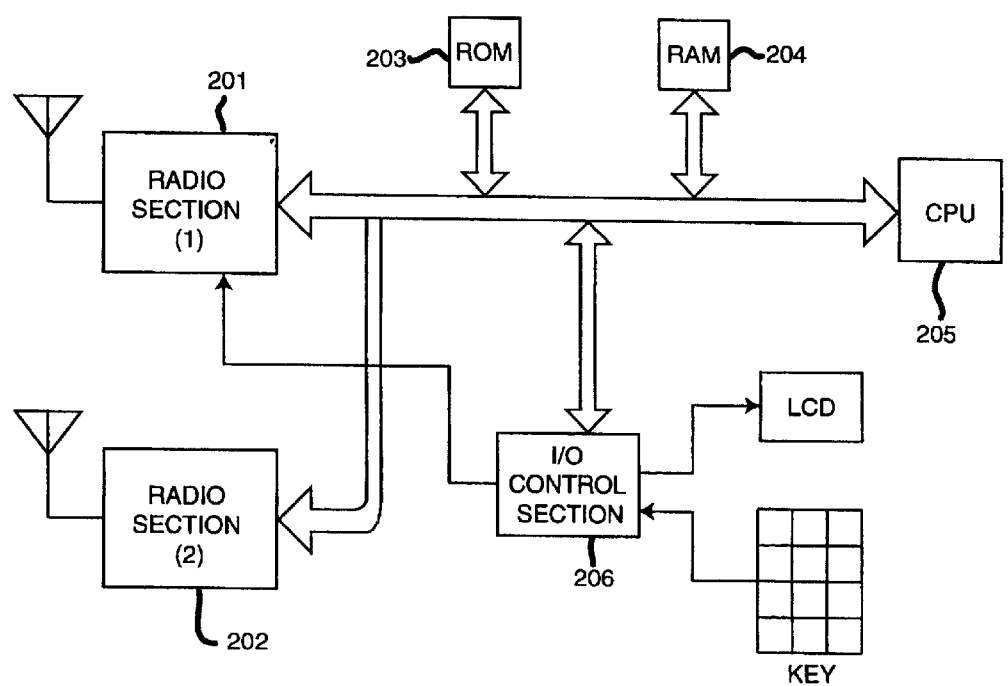
FIG. 2 is a block diagram showing a configuration of a portable telephone set of the present invention and its operation.

A portable telephone set 101 of the embodiment has a hardware block configuration like that shown in FIG. 2. The portable telephone set includes two radio sections, i.e., a radio section (1) 201 and a radio section (2) 202. Communication operations are different between these radio sections. For example, the radio section (1) communicates with the public base station device 102 while the radio section (2) communicates with the simple base station device 100. CPU 205 controls the entire system, and received/transmitted data and control data of CPU 205 are stored in ROM 204.

ROM 203 stores a control program of CPU 205, terminal ID, and so on. An I/O control section 206 controls an LCD display/key pad of LCD and power ON/OFF of the radio section (1) 201.

A hardware block configuration of the simple base station device 100 includes the same constituting elements as those of a block diagram of the portable telephone set 101 shown in FIG. 2 except the I/O control section 206 and the LCD display/key pad.

First described is an operation performed when a holder of the portable telephone set of the mode enters a building 105 where the simple base station device 100 has been installed. Herein, it is assumed that the simple base station device 100 provides a radio wave service only in a limited area in the vicinity of a doorway of the building.

When the holder of the portable telephone set 101 comes near the entrance of the building 105, the portable telephone set 101 receives a power OFF signal (106) supplied from the simple base station device 100. Upon having receives the power off signal (106), the portable telephone set 101 transmits a telephone number (107) of its own terminal to the simple base station device 100, and then switches power OFF for the radio section (1) 201 engaged in communications with the public base station device 102 by the I/O control section 206.

After having received the telephone number (107), the simple base station device 100 confirms a power OFF state of the radio section (1) 201 of the portable telephone set 101, and transmits a communication suspension setting signal (108) to the public base station device 102. The public base station device 102 that has received the above signal sends information regarding the communication-suspended portable telephone set 101 to the position management server 104 in the radio network to register it.

Next described is an operation performed when the holder of the portable telephone set 101 goes out of the building. After the holder of the portable telephone set 101 leaves the building, the portable telephone set 101 receives a power ON signal (109) at the entrance. Upon having received the power ON signal (109), the portable telephone set 101 transmits a telephone number (110) of its own terminal to the simple base station device 100, and then switches, by the I/O control section 106, power ON for the radio section (1) 201 for performing communications with the public base station device 102.

After having received the telephone number (110), the simple base station device 100 confirms a power ON state of the radio section (1) 201 and transmits a communication suspension releasing signal (111) to the public base station device 102. Upon having received the above signal, the public base station device 102 sends information regarding the suspension-released portable telephone set to the position management server 104 in the radio network to register it.

The power OFF signal (106) and the power ON signal (109) may be the same in actual practice, and identification of power OFF/ON signal can be made by the portable telephone set 101.

Next, an operation of the embodiment of the present invention will be described.

The simple base station device 100 shown in FIG. 1 is installed such that a radio wave can only reach an area in the vicinity of the entrance by using particular small power. The simple base station device 100 always supplies a power ON/OFF request signal. The public base station 102 is used as a public base station for PHS (Personal handy Phone System). The radio sections (1) 201 and (2) 202 of FIG. 2 which is a hardware block diagram of the portable telephone set are respectively used for PHS and use particular small power.

Figure 4:
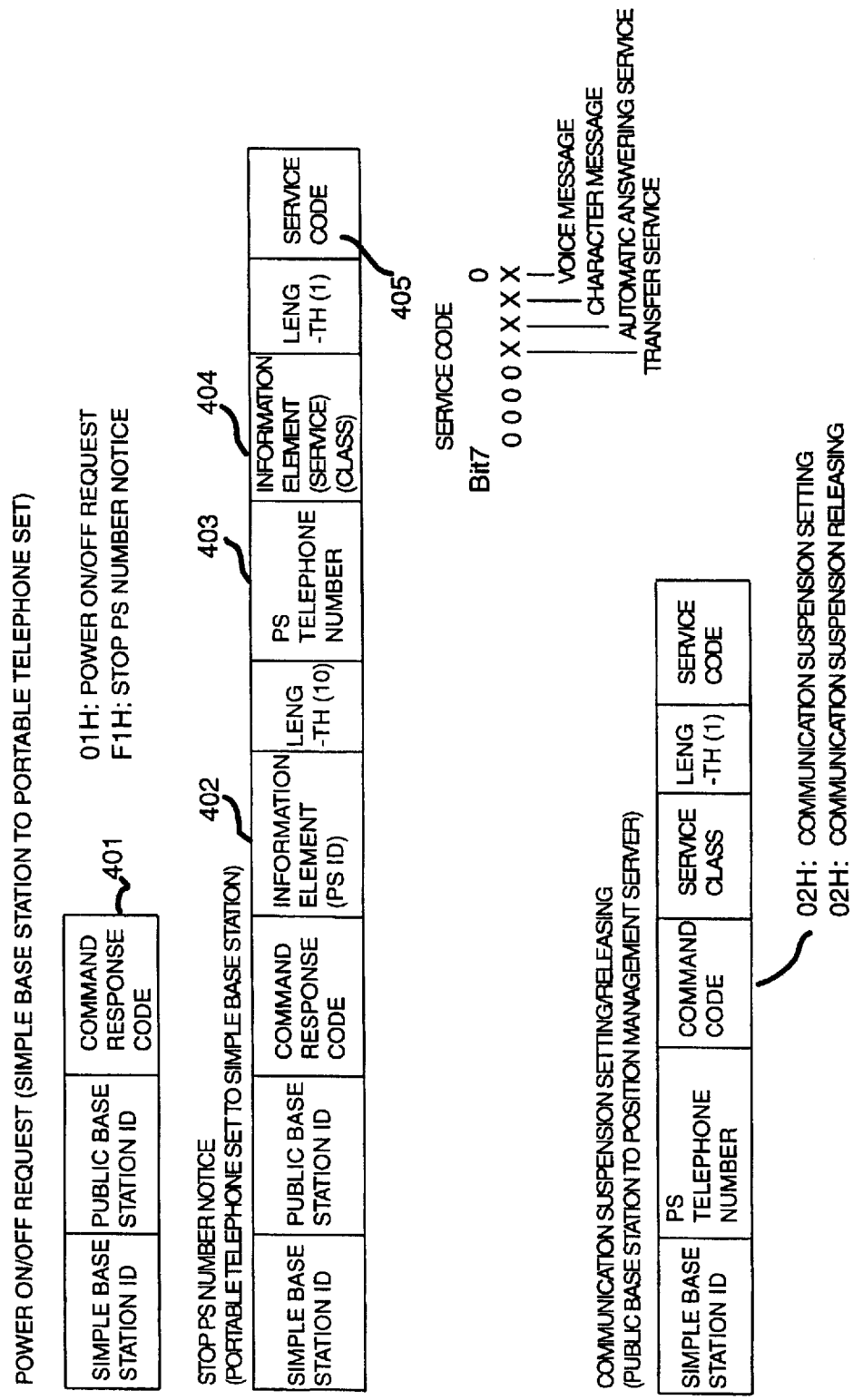
FIG. 4 is a data format of a message in the embodiment of the present invention.
Figure 5:
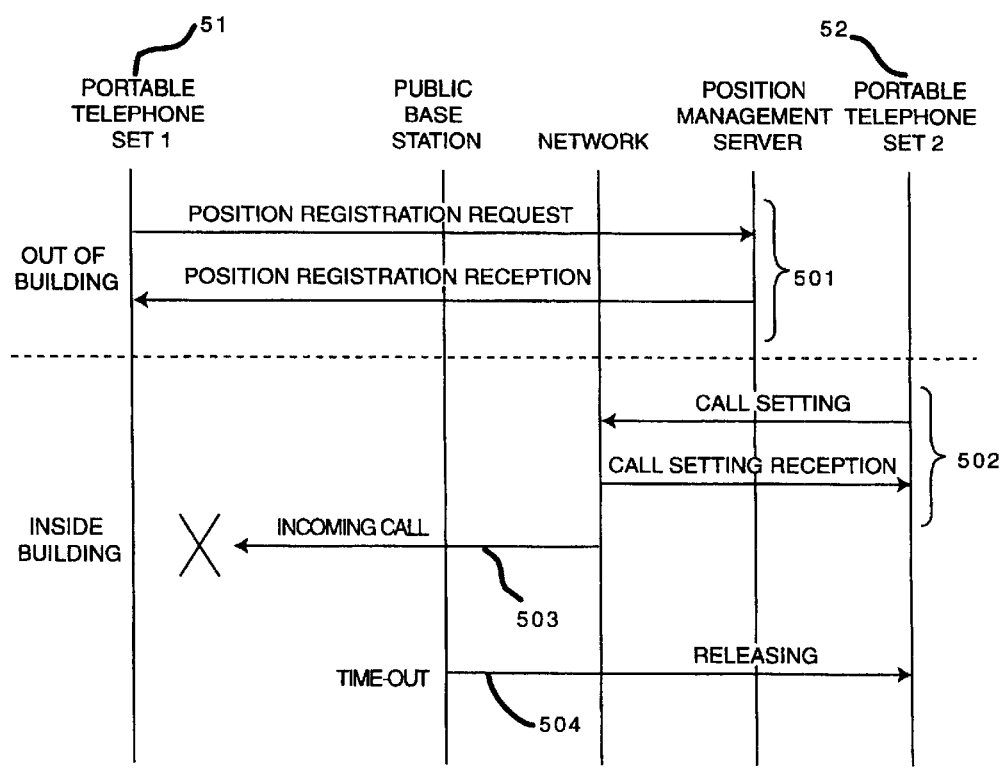
FIG. 5 is a sequence view illustrating a prior art.
Figure 6:
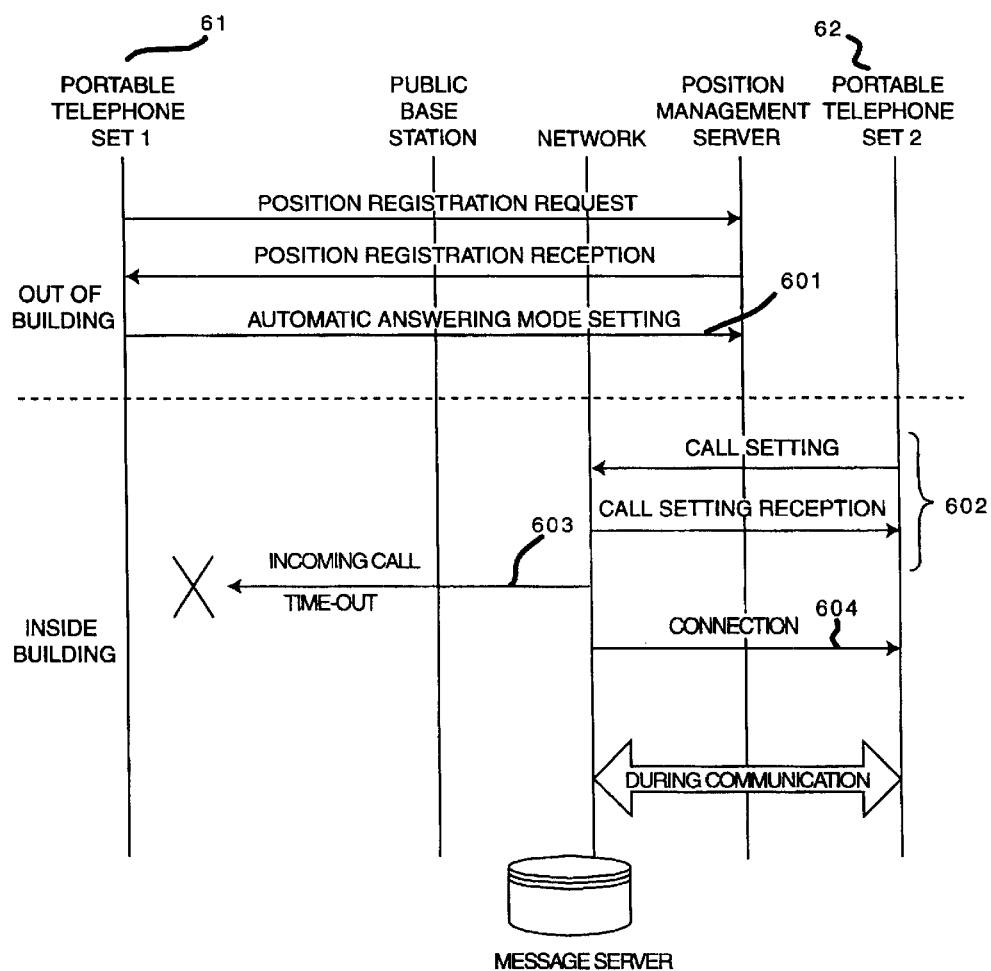
FIG. 6 is a sequence view illustrating a prior art.

For a transmitted/received message in the embodiment, a format like that shown in FIG. 4 is used. A message of such a format is, in actual practice, transmitted/received by being carried in user data of a particular small power communication format or a PHS communication format.

Added to a communication message between a simple base station and a portable telephone set are codes 01H and F1H which indicate ID of each of the simple base station and a public base station engaged in communications therewith and a content of a command/response. In order to add more information, an information element identification code and an information length are provided. For example, Two information elements are added to a stop PS number notice of a communication message sent from the portable telephone set to the simple base station. One is a PS telephone number (403) of a telephone number of the portable telephone set, and the other is a service code (405). Respectively added to these are information element identification codes of a PS ID (402) and a service class (404).

The service code is used, if a call comes in to the portable telephone set while it is in a communication suspended state, to select a service to be executed by the radio network. For the service code, there are defined a voice message for informing a communication suspended state by voice, a character message for informing by character, an automatic answering service for retaining a caller's message by changing to an automatic answering mode, a transfer telephone service for transferring a call to a preset location.

Figure 3:
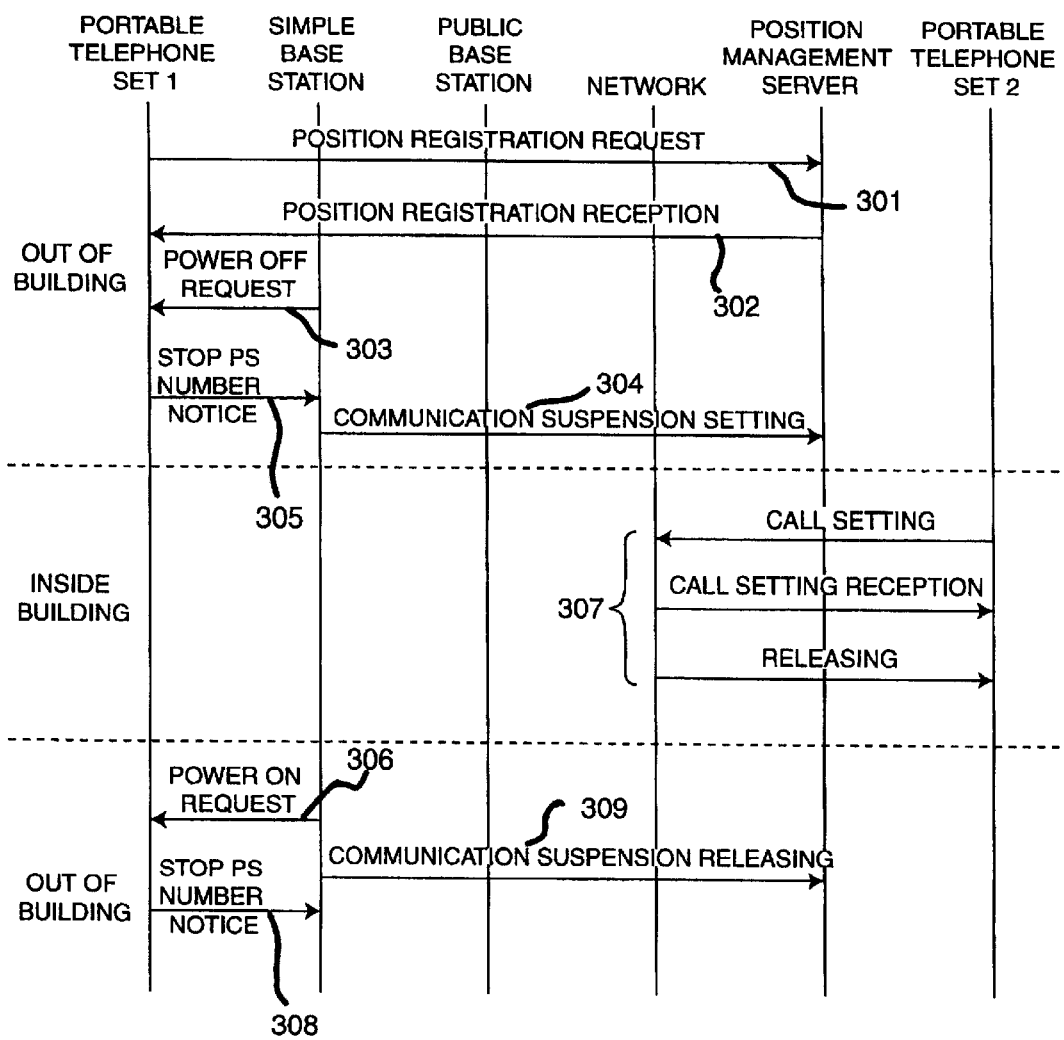
FIG. 3 is a sequence view showing an operation of an embodiment of the present invention.

Next, an operational sequence of the embodiment will be described by referring to FIGS. 1 and 3.

When the holder of the portable telephone set 101 switches power ON for the telephone set, a position registration request is transmitted through the public base station device 102 to the position management server in the radio network, and a nearest base station is registered.

When the holder of the portable telephone set 101 comes close to the building where the simple base station device of the present invention has been installed, a signal is received from the simple base station device. Herein, it is assumed that that a power ON signal and a power OFF signal are identical. Then, the portable telephone set identifies a power ON signal or a power OFF signal according to its internal state. In other words, the radio section (1) 201 determines a power OFF request signal when power is ON or a power ON request signal when power is OFF.

If it is determined that receiving of a power OFF request signal (303) is determined, then the portable telephone set 101 transmits a stop PS number notice (305) including a telephone number of its own terminal to the simple base station device in response to the power OFF request signal (303). Then, the portable telephone set 101 spontaneously switches power OFF for the ration section (1) 201.

The simple base station converts the received stop PS number notice (305) into a signal for PHS and transmits it as a message signal for communication suspension setting (304) to the public base station.

The position management server registers the current communication suspended state of the portable telephone set 101 in its database. Signals of the stop PS number notice (305) and the communication suspension setting (304) can selectively include a service content for a telephone set that has called the communication suspended portable telephone set, and this information is also registered in the database of the position management server.

If another portable telephone set calls the portable telephone set 101 (307), then the radio network confirms the current communication suspended state thereof by referring to the information stored in the position management information. In this case, the radio network performs no incoming call control for the public base station device that has registered the position of the portable telephone set and, by referring to the service content registered in the database of the position management server, provides services to the portable telephone set that has made the call. For example, if an automatic answering service has been set, connection is made to a voice storage center to store a message of the caller.

Next described is an operation performed when the portable telephone set holder goes out of the building.

Out of the building, a signal is received from the simple base station device. In this case, because of the power OFF state of the radio section (1) 201, receiving of a power ON request signal (306) is determined. The portable telephone set 101 then transmits a stop PS number notice (308) including a telephone number of its own terminal to the simple base station device in response to the power ON request signal (306). Then, the portable telephone set spontaneously switches power ON for the radio section (1) 201.

The simple base station device converts the received stop PS number notice (308) into a signal for PHS, and then transmits this signal as communication suspension releasing (309) to the public base station device.

The position management server registers releasing of the communication suspension of the portable telephone set 101 in the database. Also, information regarding service releasing for the telephone set that has call the portable telephone set, the information being included in signals of the stop PS number notice (308) and the communication suspension setting (309), is registered in the database of the position management server.

The embodiment has been described by way of example where the simple base station device is installed in the entrance of the building and a power ON/OFF instruction signal is transmitted to the portable telephone set. However, since setting is made to prevent other calls from coming in to the portable telephone set prohibited from being used even if power is ON, the simple base station device may be installed in a boundary of an area prohibiting the use of the portable telephone set and output a display signal indicating the boundary. Accordingly, it can be understood that it is not always necessary to switch power ON/OFF for the portable telephone set at the time of entering/exiting from the area prohibiting its use.

The embodiment has also been described by way of configuration example where the radio sections (1) 201 and (2) 202 are used for PHS and respectively uses particular small power. However, these radio sections can be realized by ODC, non-contact card communications, infrared ray communications, FN radio wave and feeble radio wave communications, radio wave LAN, and so on.

According to the present invention, since the position management server in the radio network registers a portable telephone set positioned in an area prohibiting its use, the radio network can recognize a communication prohibited or suspended state of the portable telephone set by referring to the registered content of the position management server when an incoming call request is made to the portable telephone set, and thereby prevent a public base station having registered a position of the portable telephone set from performing any useless incoming call processing.

Furthermore, since a simple base station device is installed in the entrance of a building or the like where the use of the portable telephone set is prohibited, the simple base station device being provided for outputting a power ON/OFF or telephone service setting instruction signal for the portable telephone set, a holder of the portable telephone set can, without performing any particular operations, automatically and surely switch power OFF or set starting of an automatic answering service.

The entire disclosure of Japanese Patent Application No. 9-227020 filed on Aug. 11, 1997 including specification, claims, drawings and summary are incorporated herein bny reference in its entirety.

What is claimed is:

1. A portable telephone comprising:

a portable telephone set having radio communication means;

a public base station device connected by a network and wire;

a position management server connected to said network; and a simple base station device having means for communicating with both of said portable telephone set and said public base station device, said simple base station device being installed in a boundary of a communication prohibited area, wherein said simple base station device includes means for transmitting a control signal for one control selected from power ON and power OFF for a radio section of said portable telephone set and means for receiving a message indicating one of communication suspension and communication suspension releasing from said portable telephone set and transmitting said message to said position management server via said public base station device, said portable telephone set includes means for transmitting, upon receiving said control signal, said message indicating one of communication suspension and communication suspension releasing to said simple base station device, said position management server including means for registering a relation between a content of said message and a telephone number of said portable telephone set, said network performs no incoming call processing for said public base station device where said portable telephone set has been position registered if a communication suspended condition of a portable telephone set is recognized by referring to said position management server, and said message indicating communication suspension transmitted from said portable telephone set includes an identifier for a telephone set that has made a call to said communication suspended portable telephone set, said identifier indicating a service content including message recording.

2. The portable telephone system of claim 1, wherein said portable telephone set switches, upon receiving one signal selected from a power ON control signal and a power OFF control signal from said simple base station device, power ON and power OFF for said radio section.

3. An apparatus for controlling the operation of a portable communication device, the apparatus comprising:

a simple base station for use in an area in which the use of the portable communication device is prohibited, the simple base station adapted to output a restricted use signal to the portable communication device and receive a communication status signal from the portable communication device in response to the restricted use signal;

a position management server coupled to the simple base station; and a public base station interposed between the position management server and the simple base station, wherein the simple base station performs position-registration of the portable communication device in the position management server via the public base station.

4. The apparatus of claim 3, wherein the restricted use signal is a display signal indicating a boundary in which use of the portable communication device is prohibited.

5. The apparatus of claim 3, wherein the restricted use signal is an instruction signal which instructs the portable communication device to perform a power ON or a power OFF control.

6. The apparatus of claim 3, wherein the communication status signal is a communication suspension setting signal or a communication suspension release setting signal.

* * * * *